United States Patent [19]

Haeuser

[11] Patent Number: 5,409,523
[45] Date of Patent: Apr. 25, 1995

[54] DEVICE AND METHOD FOR THE CONTINUOUS DEGASSING OF CASTING RESIN

[75] Inventor: Erhard Haeuser, Schoeffengrund-Schwalbach, Germany

[73] Assignee: Wilhelm Hedrich Vakuumanlagen GmbH & Co. KG, Ehringshausen-Katzenfurt, Germany

[21] Appl. No.: 200,293

[22] Filed: Feb. 22, 1994

Related U.S. Application Data

[63] Continuation of Ser. No. 916,358, Jul. 15, 1992, abandoned.

[30] Foreign Application Priority Data

Jul. 19, 1991 [DE] Germany .......... 41 24 033.2

[51] Int. Cl.$^6$ .................. B01D 19/00
[52] U.S. Cl. .............. 95/260; 95/266; 96/198; 96/199; 96/207; 96/215
[58] Field of Search ............... 95/260–262, 95/266; 96/204, 216, 217, 220, 198, 199, 207, 215, 193, 201

[56] References Cited

U.S. PATENT DOCUMENTS

| | | | |
|---|---|---|---|
| 2,908,652 | 10/1959 | Forrester | 55/52 |
| 3,229,449 | 1/1966 | Hogue | 55/202 |
| 3,358,422 | 12/1967 | Van Der Schee | 55/55 |

Primary Examiner—Richard L. Chiesa
Attorney, Agent, or Firm—Flynn, Thiel, Boutell & Tanis

[57] ABSTRACT

A device and a method for the continuous degassing of casting resin comprising a housing (1) which has an inlet (2) and an outlet (3) for passage of the casting resin and is connected to a vacuum source (4). In order to achieve with a compact design of the housing a complete continuous degassing of the casting resin material, several separate but spatially connected areas (5) are provided in the housing (1), through which areas the casting resin is sequentially guided. A structure (6; 14; 16; 35) for applying the casting resin to a degassing surface (40) are provided in each of the areas. A stripping structure (7; 17; 35; 37) is provided in each of the areas for removing the casting resin from the degassing surfaces and simultaneously transferring the casting resin into the next adjacent area.

15 Claims, 9 Drawing Sheets

DEVICE AND METHOD FOR THE CONTINUOUS DEGASSING OF CASTING RESIN

This application is a continuation of U.S. Ser. No. 07/916,358, filed Jul. 15, 1992, now abandoned.

FIELD OF THE INVENTION

The invention relates to a device for the continuous degassing of casting resin comprising a housing having an inlet and an outlet for guiding therethrough the casting resin and being connected to a vacuum source. The invention relates furthermore to a method for the continuous degassing of casting resin, in which the casting resin is guided under vacuum in a thin layer over a degassing surface.

BACKGROUND OF THE INVENTION

When manufacturing casting resin parts out of casting resin, it is necessary to carefully degas each one of the individual casting resin components prior to their mixing, on the one hand, to avoid defects from occurring in the finished casting and, on the other hand, to be able to carry out the casting operation itself without any errors and under the desired pressure conditions. As it is known from the state of the art, the casting resin mass is usually mixed out of at least one resin component and one hardener component, with the components being highly viscous liquids.

The state of the art consists of both discontinuity and also continuously working degassing systems. The casting resin or rather the casting resin components is in both cases guided over a degassing surface with the desire to apply a thin layer of the respective component to the degassing surface. The gas components in the casting resin are removed by the vacuum existing in the housing.

It must be pointed out in this connection that the description hereinafter refers to the degassing of casting resin to simplify the description. The man skilled in the art understands that, as a rule, this concerns the degassing of casting resin components, which have not yet been mixed with one another, for example a resin component or a hardener component.

The discontinuity working methods use systems which include a storage container which is so large that, as a rule, a day's charge is received therein. Degassing takes thereby place in this storage container, from which the respectively needed volume amount is removed for casting of the structural elements. The inside of the storage container is under under pressure during the degassing and during the casting operation. Circulating devices are usually provided in the storage container, which devices are used to distribute the casting resin on a large draining or degassing surface. Sufficient time for the degassing is available with this procedure during the night hours, during which the casting resin is not processed.

When production takes place during several shifts, then it is no longer possible due to the amount of required casting resin, to use the storage containers simultaneously for degassing. Therefore, additional degassing containers are utilized, in which the amount of casting resin needed for production is received and degassed. These degassing containers are mostly set up at a level above the associated storage container so that the degassed material can flow into the storage container. From this results the disadvantage of a high total height. Depending on the shift operation (two shifts or three shifts), it may be necessary to associate several degassing containers with a storage container in order to guarantee a sufficient degassing time for the casting resin. From this results also an occupation of a large amount of space which in turn leads to high costs for the system.

Furthermore, there exists the disadvantage with such systems that, with the apparently advantageous possibility to always add nondegassed material into the storage container as is continuously being removed, the gas content in the stored material increases considerably due to the added nondegassed material, in spite of a continuously running degassing operation. The demands for quality are as a rule no longer met. A bringing of nondegassed material together with the already degassed material must, therefore, be avoided under all circumstances.

It is known in the continuously operating devices to insert in a housing a horizontally arranged, rotatable plate, onto which the casting resin is applied. By rotating the plate, the casting resin is guided radially outwardly so that it can run off downwardly on the inner walls of the housing. The under pressure in the housing brings about the continuous degassing. The disadvantage of these devices is that it is not guaranteed that only the completely degassed product reaches the bottom area of the housing to be further processed from there. Rather, it is possible, for example, by moving too much casting resin onto the rotating plate, for this casting resin to drip downwardly in a nondegassed state. This would result in a mixed product which is not sufficiently degassed.

A cascade degassing is provided in a further device known from the state of the art, in which the casting resin runs cascade-like over several degassing surfaces arranged in the housing. This theoretically enables a fine distribution of the casting resin and a long treatment time. The disadvantage is that it cannot be assured, nor monitored, that the casting resin is distributed in an even layer on the degassing surfaces. Rather a so-called "stream formation" occurs often, during which the casting resin flows in large volume streams downwardly at certain points on the degassing surface. Only an insufficient degassing or none at all takes place at these points for understandable reasons.

SUMMARY OF THE INVENTION

The basic purpose of the invention is to provide a device and a method for the continuous degassing of casting resin, which with a simple design and effective operation guarantee a good degassing of the casting resin and have a high degree of operating safety.

With respect to the device, the purpose is attained by providing several areas in the housing, through which areas the casting resin is successively guided for facilitating a step-like degassing, with means being associated with each area for applying the casting resin to a degassing surface associated with the area and means for transferring the casting resin into the next area.

The device of the invention is distinguished by a number of significant advantages. Since several areas are provided in the housing, which areas are separated from one another, a step-like degassing is possible during a continuous flow of the casting resin through the housing, during which degassing the content of gas in the casting resin is constantly reduced from one step to the other. It is of a particularly great advantage that always only predegassed material can be guided from one area to the other so that an unintended flow through the device, as this is known from the state of the art, is entirely impossible. Thus, a large degassing surface can, according to the invention, be available through simple means so that the device having a compact design operates with a high efficiency and high operating safety.

A particularly favorable embodiment of the invention provides that the housing is constructed as an upstanding cylinder having an upper inlet and a lower outlet and the areas are formed by several pistons each sealingly arranged in the housing, which pistons each have an opening for the casting resin and are movable in a longitudinal direction of the housing. Thus, the individual pistons form, according to the invention, separating elements which define the areas, with the respectively degassed casting resin being able to accumulate on the respective surface of the piston and be guided through the opening into the next area. Since the individual pistons can be moved up and down in the longitudinal direction of the cylinder, a very high degassing surface is created, with the up and down movement of the piston resulting in an even application of the casting resin on the surface and in a removal from the surface. The described embodiment of the device thus guarantees, with the simplest construction and space-saving design, a very high efficiency and a good degassing of the casting resin. By suitably selecting the amount of casting resin to be guided through the device, the stroke speed of the piston and the opening into the piston, the degassing performance is variable within a wide scope and can be adapted to the respective conditions for use.

The pistons are advantageously connected with one another by means of a common piston rod in order to guarantee a synchronous movement of the pistons and to keep the respective volume in the individual areas unchanged.

In order to guarantee an even application or rather an even removal of the casting resin to or from the inner wall of the housing (degassing surface), the periphery of the pistons are designed such that they form together with the degassing surface of the housing an upwardly open trough.

It is furthermore advantageous to arrange the openings of the pistons so that a desired flow through the individual areas is achieved.

It is furthermore particularly advantageous, according to the invention, when the container has at least one level sensor in the collecting area. The level sensor determines whether a sufficient amount of degassed material is in the last area, that is, in the collecting area of the container in order to be able to carry out the respectively next following casting operation. Thus, it is assured that sufficient casting resin volume can be supplied to the flow mixer arranged after the device of the invention.

A further, particularly favorable, embodiment is the provision of a return pipeline extending from the outlet region of the container to an area of the container and-/or storage container upstream of the outlet. This measure makes it possible for the material accumulated in the collecting area to be fed, for example through valves which are provided in the pump-out pipeline, selectively to one of the degassing areas or the storage container. This makes it possible for material accumulated in the bottom of the housing to be subjected to a further degassing process during the time periods in which no casting is taking place, or the device is emptied during shutdown times.

Since a pump is needed to supply the degassed casting resin to the flow mixer, it can be particularly advantageous when the piston rod connecting the individual pistons carries a pump piston at its lower end, which pump piston can be moved into a pump cylinder fastened on the housing. Thus, the movement of the piston in the cylinder can be connected with the casting operation, which means with the operation of the pump.

The device can advantageously also be operated such that the movement of the pistons for the purpose of effecting degassing, without pump feeding, can be carried out in an upper stroke area, while at least a lower stroke area is utilized for the simultaneous degassing and pump feeding.

The housing is, in an alternative embodiment of the invention, constructed as an upstanding cylinder having an upper inlet and a lower outlet, with the areas being formed by a helical flight rotatably supported in the housing, an outer contour of the helical flight being sealingly guided on the inner surface of the housing. The helical flight can be rotated preferably in the same direction, in an opposite direction or alternately with respect to the flow direction of the casting resin. It is hereby assured that the casting resin material is, for a sufficient time period in the respective "degassing area". The rotation of the helical flight assures thereby that the casting resin remains on the degassing surface formed by both the inner wall of the housing and also by the helical flight surface. The direction of rotation of the helical flight is adapted in a preferred manner to the viscosity of the casting resin material in order to be able to adhere to a sufficient degassing time.

A further, also very favorable, embodiment of the invention provides that the housing is constructed as a horizontal cylinder with an inlet and outlet on the bottom side thereof, with the areas being formed by several vertically upright partitions which extend over a partial area of the height of the cylinder. One plate, which is rotatable about a horizontal axis and is guided with play in the area, is associated with each area. Furthermore, a stripping means, which is secured to the housing rest against the respectively adjacent plate is provided at least at the upper edge of each partition, which stripping means removes during rotation of the plate therepast accumulated casting resin material off from the respective plate area and transfers it to the next area. It is understood that the stripping means, when the partitions are constructed all together essentially semicircularly, is arranged only on one half of the upper edge of the partition. The rotating vertically upright plate becomes immersed in this embodiment of the device in the area and is wetted with the casting resin material. This partial area of the plate leaves, during the next following rotation, the area coated with the casting resin so that the casting resin coat is exposed to the influence of the vacuum or under pressure. The degassing hereby takes place. During a further rotation of the plate, this partial area of the casting resin reaches the stripping means and is transferred into the next area. The areas are thus distinguished with respect to their content such that from the inlet side of the housing toward the outlet side there exists in each case a smaller amount of gas in the material of each area. The dimensions of the plates and the speed of rotation can be adapted in the simplest manner to the respective conditions for use, in particular to the type of the material. The plates are preferably arranged on a common axis of rotation.

Brush or comb-like stripping means are utilized in a further advantageous embodiment, which stripping means have the purpose of not only applying the material to be degassed to the degassing surfaces, but also to continuously slice through this material so that the gases contained in lower layers reach the surface quicker and thus the degassing operation as a whole is accelerated.

The housing is in a further advantageous embodiment of the invention constructed as a horizontal or inclined cylinder, with a rotatable drum being arranged in this housing. One or several helical ribbons are mounted on the inner side of the drum, namely, on the degassing surface thereof. The helical ribbons assure during a rotation of the drum, on the one hand, a transport of the material from the inlet to the outlet and, on the other hand, significantly enlarge the available degassing surface of the drum. Such a device can also advantageously be driven in the "reciprocating rolling method", which is particularly advantageous for a material with sedimentizing fillers.

It can be favorable in all described embodiments when the wall of the housing and/or the degassing surfaces are constructed as heat exchanger surfaces for heating and cooling in order, for example, to heat in this manner the casting resin in order to, on the one hand, improve the flow characteristics and, on the other hand, be able to more effectively carry out the degassing operation. It is also possible to heat the supply container from which the casting resin is guided into the housing, and/or to provide it with an agitating device.

Regarding the method, the purpose is attained according to the invention by the casting resin being treated in steps in successive, separate degassing steps. Thus, it is assured that a reliable degassing takes place. In order to guarantee a fine distribution of the casting resin on a surface as large as possible and in order to be able, on the other hand, to carry out after a sufficient degassing time a transfer into the next area, distribution and transfer means of different constructions, like pistons, screws, plates, etc, which also partly themselves form the degassing surfaces, are provided.

The invention thus assures that the casting resin is applied to a pregiven degassing surface, remains there during a pregiven, adjustable degassing time, and is thereafter removed from this surface and guided to the next degassing step.

The degassing device of the invention can in the same manner also be utilized for mixing of various casting resin components so that, if necessary, also a finished casting resin mixture can be obtained. A homogeneous mixing and degassing occurs then simultaneously.

BRIEF DESCRIPTION OF THE DRAWINGS

The invention will be described hereinafter in connection with exemplary embodiments and the drawings, in which:

FIG. 2 is a view of a device of the invention corresponding with FIG. 2.

DETAILED DESCRIPTION OF THE PREFERRED EMBODIMENTS

Figure 1:
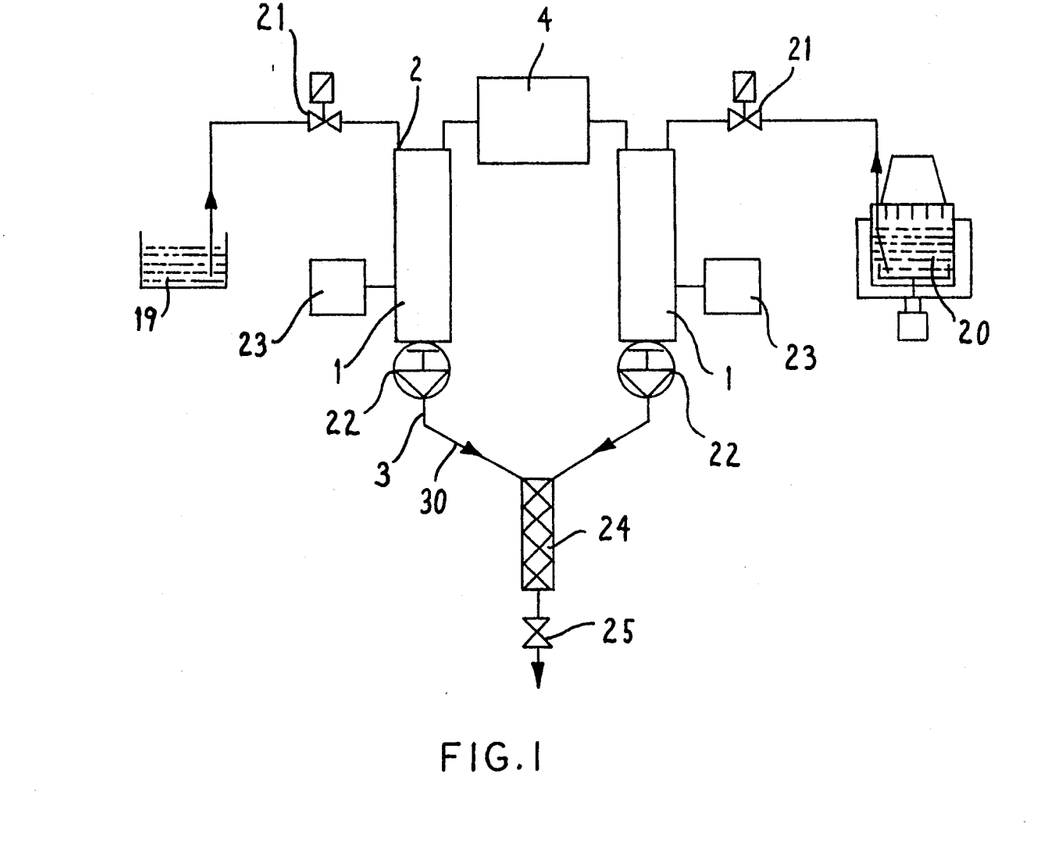
FIG. 1 is a schematic view of a degassing system using the device of the invention.

FIG. 1 shows a casting resin processing system which enables the degassing and mixing of two components. The system includes storage containers 19 and 20, with the left storage container 19, for example, being provided for a watery material, and the right storage container 20 being provided with an agitator and a heater in order to agitate a highly viscous material and/or a material containing fillers. The system includes furthermore two housings 1 of the degassing devices to be described hereinafter. The housings 1 are arranged parallel to one another in FIG. 1 and are each connected to the storage containers 19, 20 through a pipeline. A flow controller 21 is arranged in each of the pipelines. Furthermore, the inner chambers of the housing 1 are connected to a vacuum source 4. A heater 23 is associated with each housing 1. A pump device 22 for the synchronous dosing of the material volume to be removed in each case and for supplying same to a flow mixer 24 is provided at the outlet area of each housing 1. A casting valve 25 is arranged at the outlet of the flow mixer 24 in order to feed the mixed casting resin mass to a mold (not illustrated).

Figure 2:
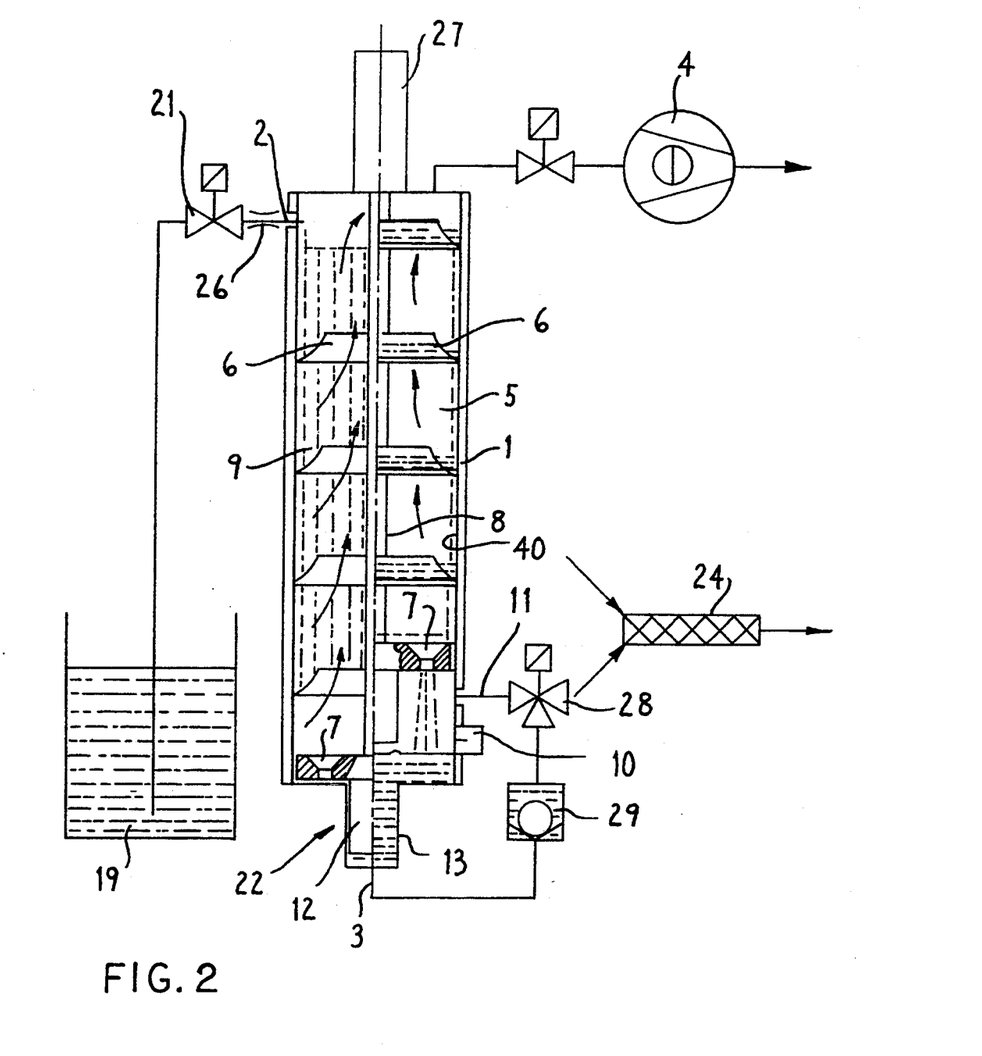
FIG. 2 is a schematic partially cross-sectioned view of a first exemplary embodiment of the device of the invention.

FIG. 2 shows a preferred exemplary embodiment of the device of the invention which, regarding the schematic illustration, corresponds with the left half of FIG. 1. The casting resin material from the storage container 19 is fed through the flow controller 21 and a throttle 26 arranged after the flow controller to an upper inlet 2 of the housing 1. The material can be discharged through a lower outlet 3 and can be fed to the flow mixer 24.

A piston rod 8, in the exemplary embodiment illustrated in FIG. 2, is centrally arranged in the vertically arranged, upstanding cylinder of the housing 1. The piston rod can be moved up and down in vertical direction by a drive 27. A guide plate 41 for the piston rod and the pump piston 12 is arranged at the lower end of the piston rod 8, which guide plate has openings 42 through which the casting resin flows into the pump cylinder 13. This guide plate has at the same time the task of mixing the already degassed casting resin and preventing a settling of solid materials 10 possibly contained in the casting resin. Several pistons 6 are fastened to the piston rod 8, all together four such pistons in the illustrated exemplary embodiment. The left half of FIG. 2 shows a state in which the pistons 6 and the piston rod 8 are moved downwardly, while the right half shows a state in which the pistons 6 and the piston rod 8 are in an upper state.

The pistons 6 are each designed as circular pistons and are supported closely on the inner wall of the housing 1. The pistons 6 form together with the degassing surface 40 an upwardly open trough 9. Furthermore, each piston 6 has at least one opening 7 in order to guide casting resin material from the area 5 formed between each two pistons into the next following area.

A level sensor 10 is furthermore arranged at the bottom end area of the housing 1, which level sensor is operatively connected to a control device (not shown) to which is also connected the drive 27 and the flow controller 21. A check valve 29 is furthermore provided in the outlet pipeline of the housing 1, which check valve is followed by a three-way valve 28, which is connected to a return pipeline 11 and a pipeline 30 to the flow mixer 24.

Figure 21:
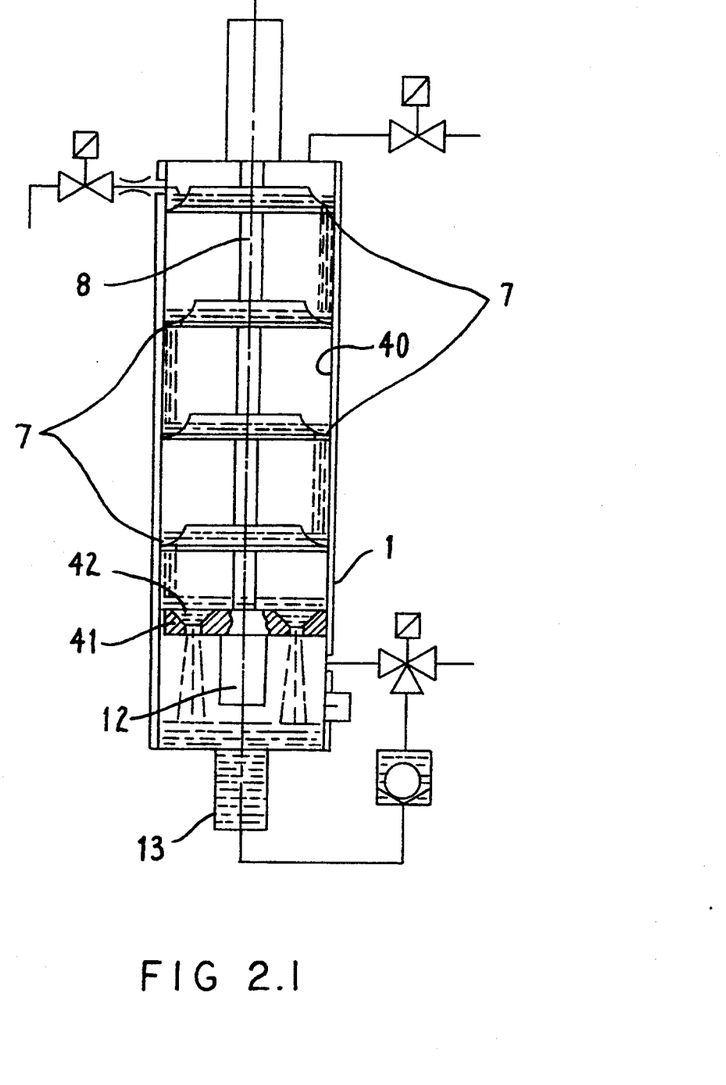

The operation of the device illustrated in FIG. 2 will be described hereinafter:

Casting resin material is guided from the storage container 19 through the flow controller 21 and the throttle 26 into the upper inlet 2 of the housing 1. A first area 5 is formed above the uppermost piston 6 in order to receive the material which has not yet been degassed. During a downward movement of the piston 6, the material can accumulate above the piston 6, it is in particular introduced into the trough 9. During an upward movement of the piston 6, the material is wiped off the wall of the housing 1 and is collected above the piston 6, for example, in the trough 9. The material in the trough 9 wets during a downwardly directed movement of the piston 6 the housing wall 1 and can in this manner be degassed by the vacuum applied by the vacuum source 4. The described operating steps are repeated cyclically. After a predetermined volume of material has accumulated above the uppermost piston 6, the material can flow through the opening 7 as this is shown in FIG. 2.1. Thus the material reaches the surface of the next following piston 6, with the degassing operation being repeated cyclically in an analogous manner. Thus the material flows through the individual areas 5 after a presettable duration and accumulates in the bottom area of the housing 1. The level of the material, which is now completely degassed, is determined by the level sensor 10. A transfer to the flow mixer 24 does not occur when the volume of material is too low. The material accumulated in the bottom area of the housing 1 can be recirculated through the return pipeline 12 and the three-way valve 28 in order to continue to keep this material under degassing conditions when no casting operation takes place.

The lower area of the piston rod 8 is designed as a pump piston 12 which can be moved into a pump cylinder 13 of the housing 1. Thus the drive 27 pumps off the degassed material. If no transfer into the flow mixer 24 is desired, the material is pumped through the return pipeline 11 into one of the areas 5 or into the storage container 19, 20.

The wall of the housing 1 can be designed as a heatable or coolable double wall.

Figure 3:
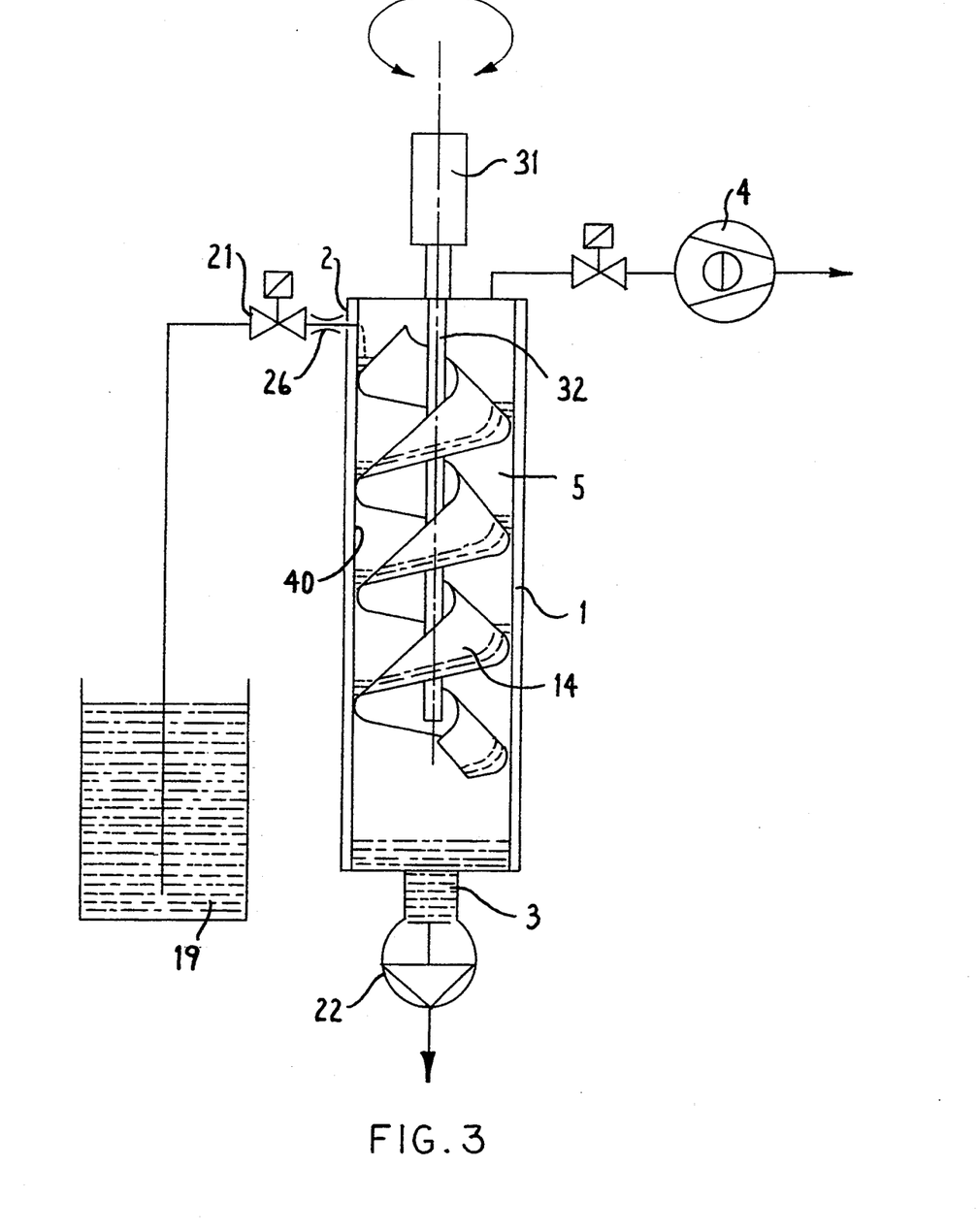
FIG. 3 is a view, similar to FIG. 2, of a further exemplary embodiment of the device of the invention.

FIG. 3 shows a further exemplary embodiment which differs from the exemplary embodiment according to FIG. 2 in the following areas. Identical characteristics are not described. A drive 31 is provided at the upper area of the housing 1 in the 10 exemplary embodiment illustrated in FIG. 3, which drive initiates the rotation of a shaft 32 on which a helical flight 14 is fastened. The helical flight 14 rests with its outer contour sealingly against the inner wall of the housing 1. The drive 31 rotates the helical flight 14 in the same direction, in opposite direction or alternately with respect to the flow direction of the casting resin material. This results in an even distribution of the casting resin material both on the inner wall of the housing 1 and also on the surface of the helical flight 14. By rotating the helical flight, which can also be alternately, the casting resin material deposited on the housing wall is cyclically removed or applied so that an effect occurs which is analogous to the operation of the device according to FIG. 2.

Figure 4:
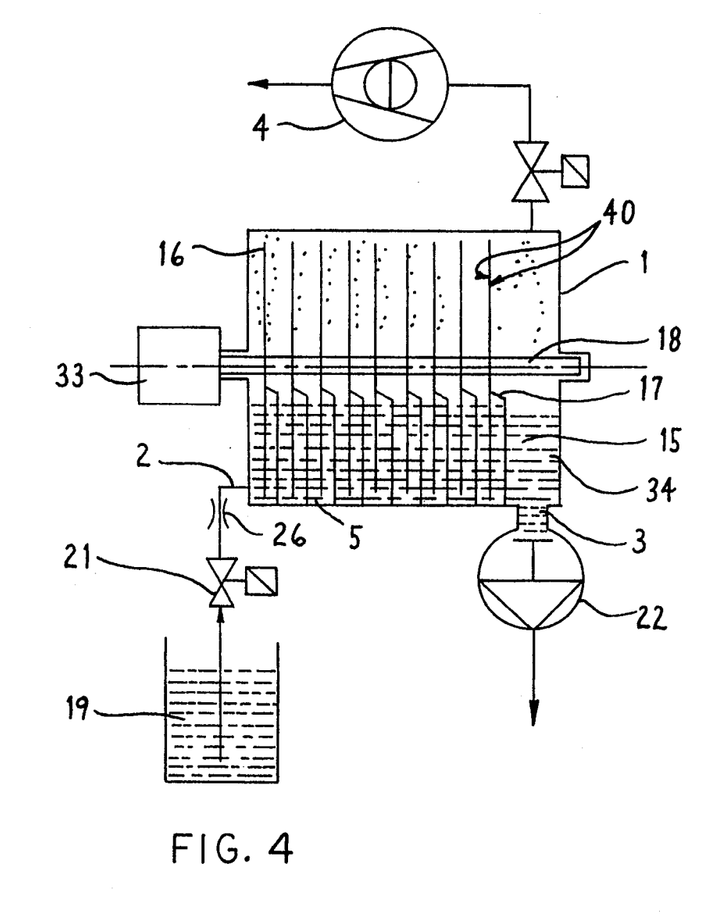
FIG. 4 is a schematic partially cross-sectioned side view of a further exemplary embodiment of the device of the invention.
Figure 5:
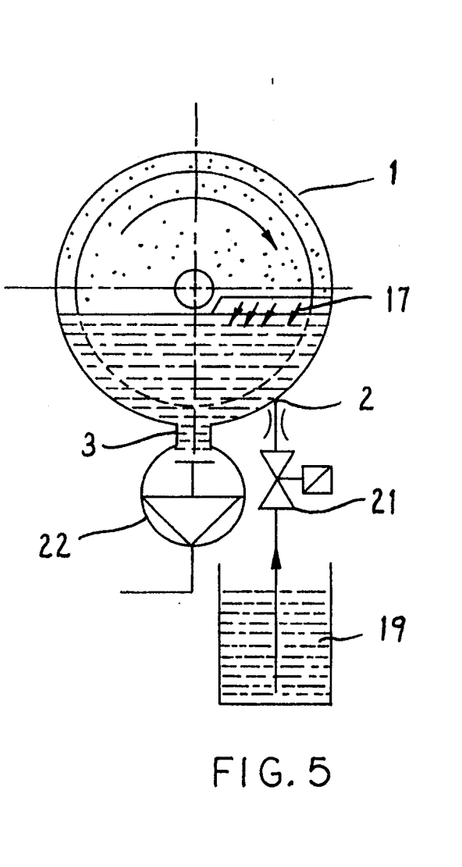
FIG. 5 is an also partially cross-sectioned front view of the device illustrated in FIG. 4.

FIGS. 4 and 5 show a further embodiment of the device of the invention. It includes a cylindrical, horizontally oriented housing 1 in which an axle of rotation 18 is centrically rotatably supported by a drive 33. Circular plates 16, which are parallel to one another, are fastened on the axle of rotation 18. The housing 1 has an inlet 2 at one bottom end and an outlet 3 at an opposite bottom end.

As is particularly shown in FIG. 4, several vertical partitions 15 extend in the lower half of the housing 1. The partitions end below the axis 18 so that individual areas 5 are formed. A stripping means 17 is arranged on one half of the upper edge of each partition 15, which stripping means rests against or slidingly engages the respective plate 16. By rotating the plate 16 in clockwise direction (see FIG. 5), the material which, during the immersion of the plate 16 into the area 5, accumulates on same is transferred into the upper chamber of the housing 1 where it is exposed to the action of the vacuum source 4. A thin film of material is thereby arranged on the plates 16 so that degassing can take place under defined conditions. The material adhering to one side of the plate (right side according to FIG. 4) is, during a rotation of the plates 16, removed by the stripping means 17 and is transferred into the next following area 5 or rather into an outlet section 34 located adjacent the outlet 3. Thus a continuous degassing of the material takes place, with the material being further degassed in each following area.

Figure 6:
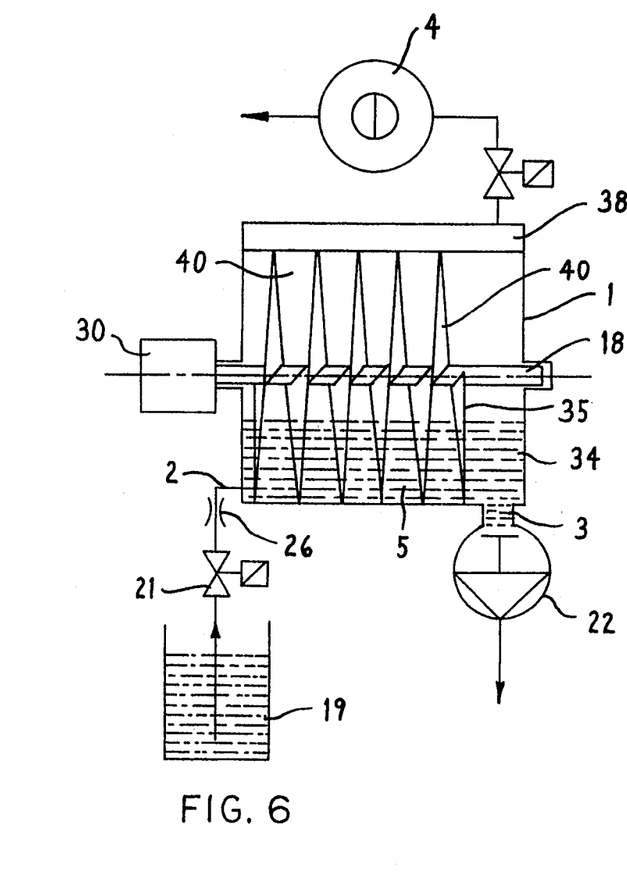
FIG. 6 is a partially cross-sectioned side view of a further exemplary embodiment according to the invention.
Figure 7:
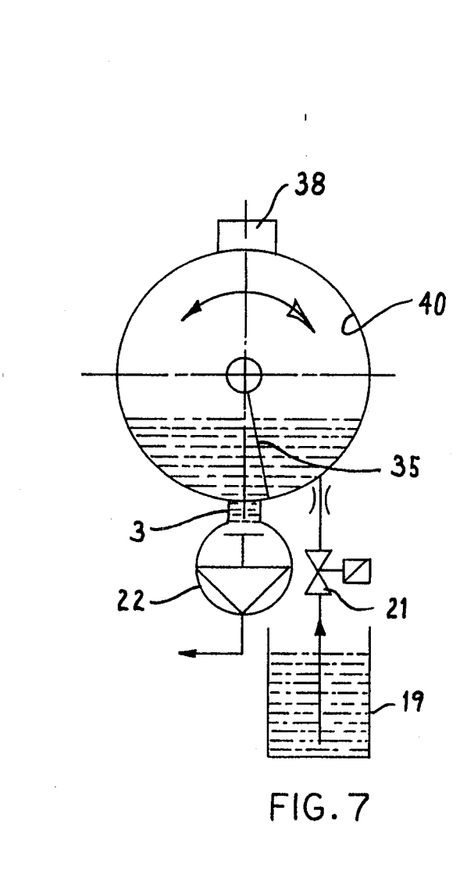
FIG. 7 is a partially cross-sectioned front view of the exemplary embodiment according to FIG. 6.

The exemplary embodiment according to FIGS. 6 and 7 is designed according to the embodiment of FIG. 4, with the same parts having the same reference numerals. The difference between this exemplary embodiment and the one according to FIGS. 4 and 5 is that separate stationary areas 5 are here not constructed but instead these stationary areas 5, corresponding with the exemplary embodiment according to FIG. 3, are formed by a rotating screw, with the screw being guided sealingly on the inner walls of the device 1 so that the casting resin entering through the inlet 2 cannot flow directly to the outlet 3. A suction channel 38 is arranged above the screw, as this is clearly shown in FIG. 7. The individual areas inside the device 1 are evacuated through this suction channel 38. The device can be operated either exclusively in conveying direction, namely, when a sufficient number of areas are created which are needed for the degassing. If one wants to make the device shorter, the screw can be operated with the reciprocating rolling method, namely, the screw oscillates, with the zero point of the oscillation movement moving constantly in the exemplary embodiment corresponding with the solid arrow in FIG. 7 so that the casting resin contained in the areas is slowly transported from the inlet to the outlet.

Figure 8:
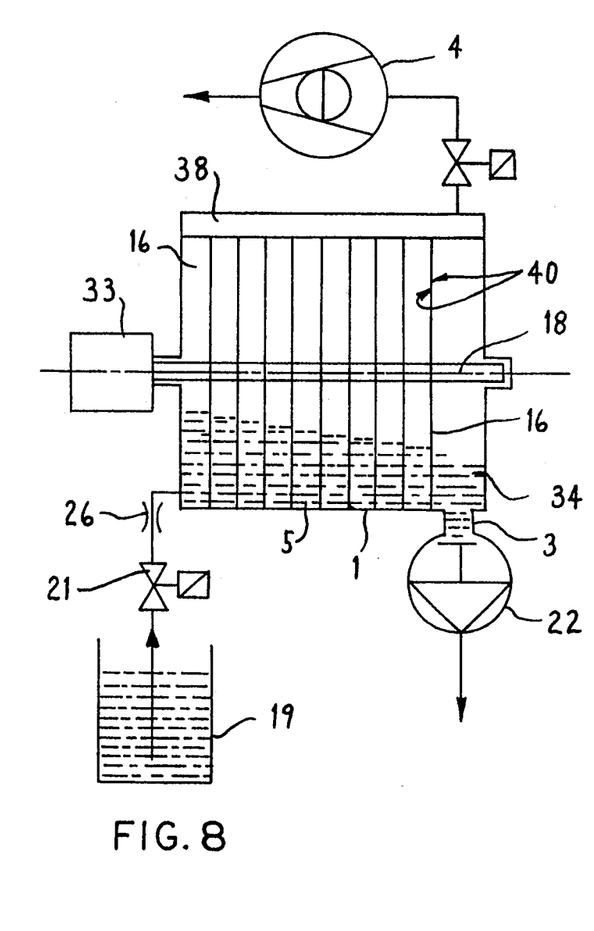
FIG. 8 is a schematic partially cross-sectioned side view of a further exemplary embodiment.
Figure 9:
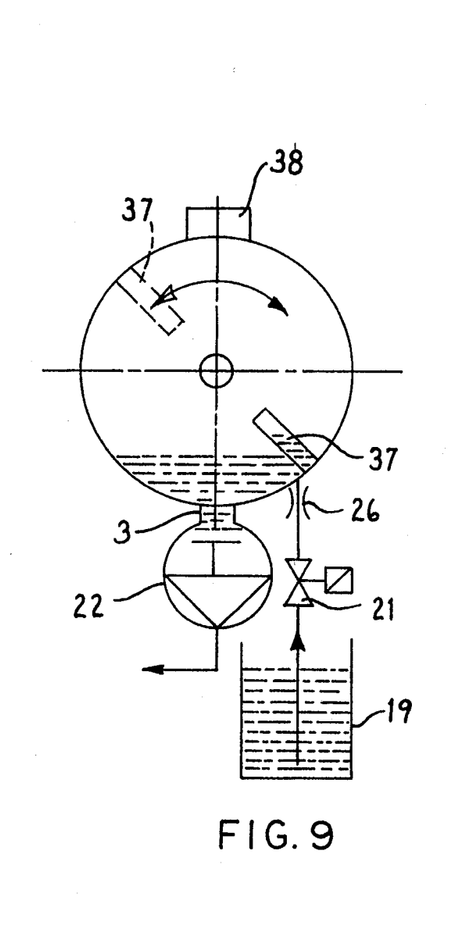
FIG. 9 is a partially cross-sectioned front view of the exemplary embodiment according to FIG. 8.

The exemplary embodiment illustrated in FIGS. 8 and 9 corresponds essentially with the exemplary embodiment according to FIGS. 6 and 7, with the helical flights 14 having been replaced by individual plates 16 which also move sealingly along the inner walls of the device 1. In order to achieve here a movement of the casting resin from the inlet 2 to the outlet 3, openings 37 are arranged in the plates 16. A suction channel 38 covering all areas 5 is used to facilitate the evacuation. This device can either operate rotatingly or, however, it can be moved in the reciprocating rolling method, with the openings 37 immersing only at times into the casting resin and permitting the further transport of the casting resin to the outlet 3.

Figure 10:
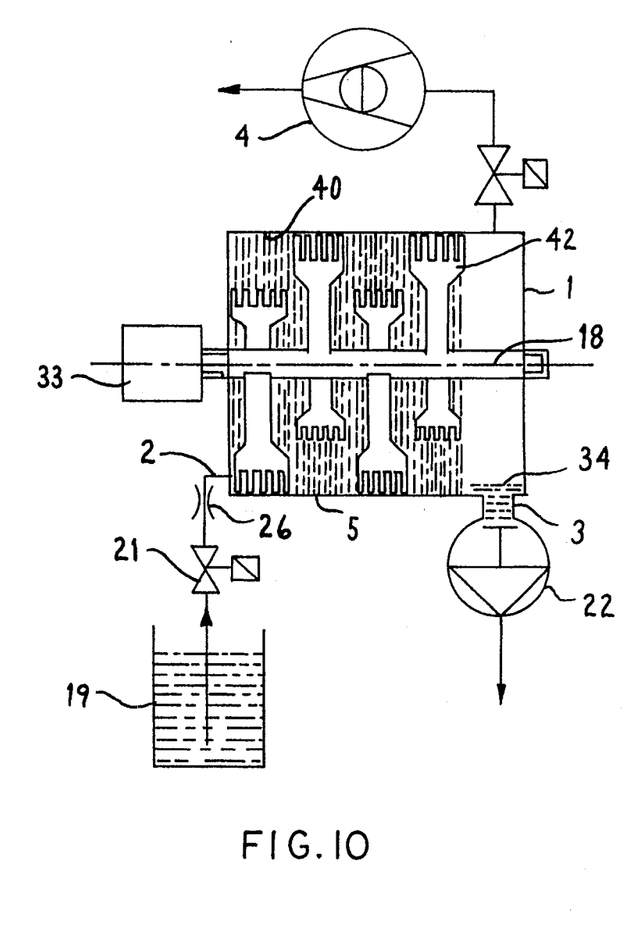
FIG. 10 is a schematic side view of a further exemplary embodiment with comb-like or brushlike stripping means.
Figure 11:
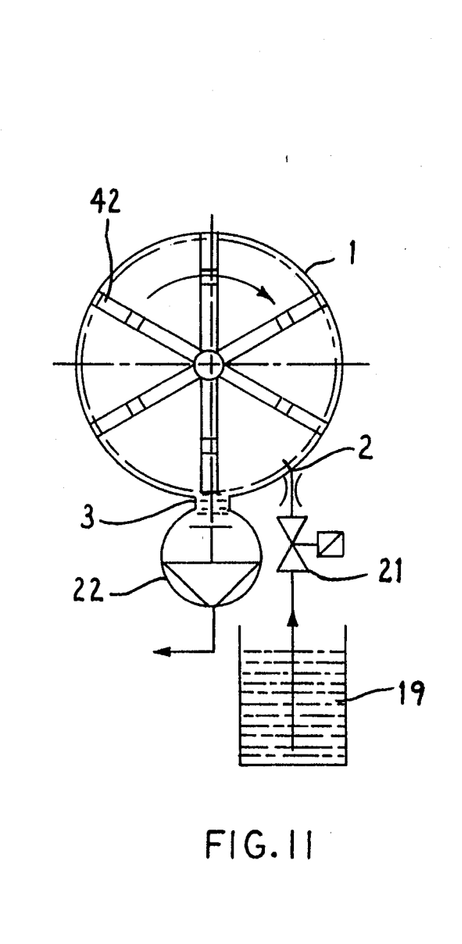
FIG. 11 is a cross-sectioned view of the exemplary embodiment according to FIG. 10.

The degassing device in the exemplary embodiment according to FIGS. 10 and 11 consists of a horizontally arranged cylinder, the inner wall of which cylinder forms the degassing surface 40. This cylinder can, in contrast to the exemplary embodiment, also be arranged inclined or even vertically, with the inclination being able to be varied also in dependency of the viscosity of the medium to be degassed. The same parts are identified with the same reference numerals in this exemplary embodiment. The difference between this exemplary embodiment and the exemplary embodiments discussed above is that stripping means like brushes or combs are arranged rotatably inside of the housing 1, with three stripping means 42 offset each at 120° to one another being each arranged in one plane as shown in FIG. 11. These brushes or combs 42 slice through the material to be degassed and supplied through the inlet 2 so that new surfaces are constantly created, which are significantly larger than the degassing surface 40. With this a very intensive and most of all quick degassing of the material is possible.

Moldings (not illustrated) can be arranged between the individual stripping means 42 so that also the duration in the area of the individual stripping means can be controlled. These brush or comb-like stripping means can also be utilized in the other devices.

Figure 12:
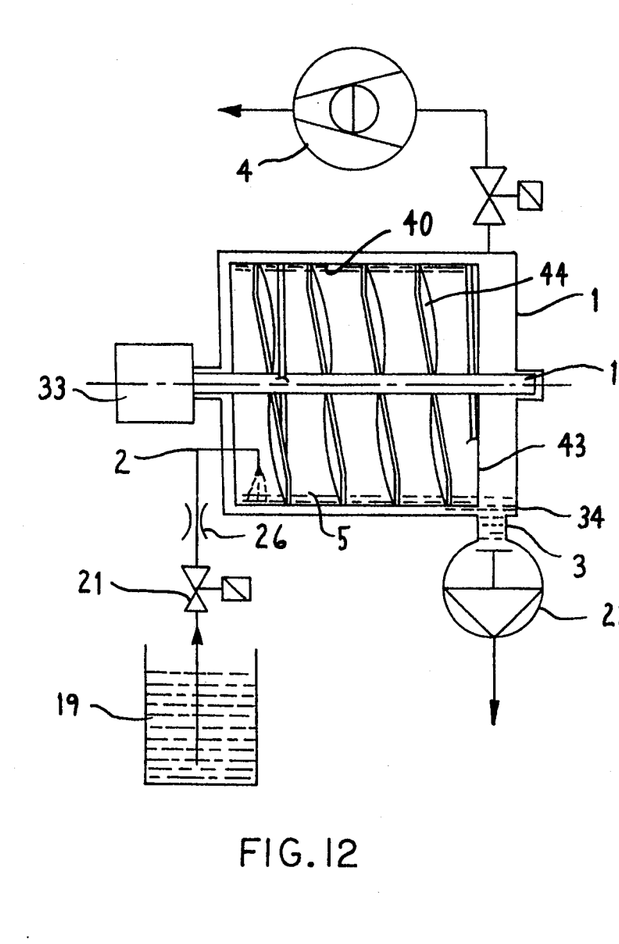
FIG. 12 shows a further exemplary embodiment according to the invention having a rotatable device with helical ribbons mounted on the degassing surfaces.
Figure 13:
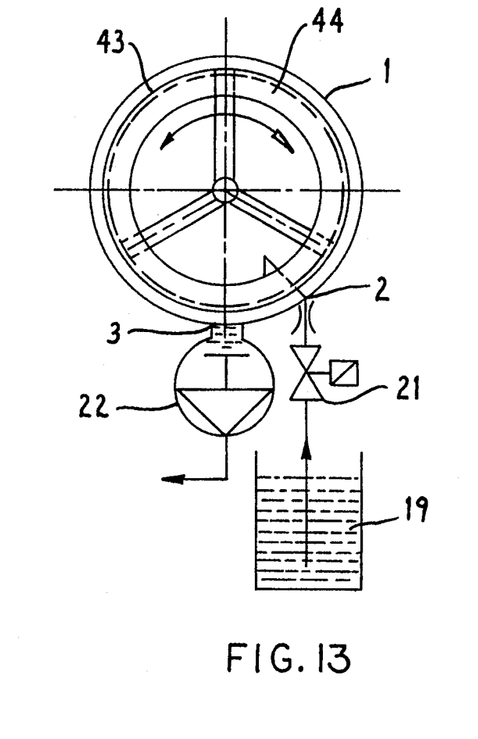
FIG. 13 is a cross-sectional view of the exemplary embodiment according to FIG. 12.

The exemplary embodiment according to FIGS. 12 and 13 represents an alternative according to the exemplary embodiment of FIGS. 4 to 7. Identical parts have the same reference numerals. A drum 43 is rotatably arranged in the evacuatable housing 1 in this embodiment, with same being able to be horizontally arranged or inclined. A helical ribbon 44 is mounted inside of the drum on the degassing surface 40, which helical ribbon contributes during a rotation of the drum to the distribution of the material supplied through the inlet 2. With this the degassing surface is, on the one hand, enlarged and, on the other hand, the degassed material is moved to the outlet 3. The speed and also the direction of rotation can be changed in dependency of the degassing task. In certain cases it may also be advisable to rotate the drum in the "reciprocating rolling method". This is particularly advantageous when a material which is to be degassed is used which has a sedimentating filler. The sedimentation direction for the filler particles is alternately reversed by the alternating rotation of the drum so that a separation is counteracted.

The invention is not to be limited to the illustrated exemplary embodiment, rather many possibilities for modifications exist within the scope of the invention.

What is claimed is:

1. A method for the continuous degassing of casting resin, comprising the steps of:
   creating and maintaining a pressure less than atmospheric pressure inside of a closed vessel having an inlet port and an outlet port and plural separated but spatially connected areas therein;
   feeding the casting resin to the inlet port so that casting resin is present inside said vessel and at least in a first of said areas;
   spreading the casting resin in a thin layer over a first degassing surface in said first area to cause any gas contained within the casting resin to surface and be removed from the vessel by reason of the maintaining of the negative pressure inside said vessel; and
   slidingly engaging the first degassing surface with a casting resin removing device to remove the casting resin from the first degassing surface and simultaneously effecting a transfer of the removed casting resin into a next adjacent one of the separate but spatially connected areas inside said vessel and, while the casting resin is in the next adjacent one of the areas, it is spread onto a further degassing surface therein so as to allow any gas contained within the casting resin to surface and be removed from said vessel by reason of the maintaining of the negative pressure inside said vessel.

2. In a device for the continuous degassing of a casting resin comprising a hollow housing having an inlet port and an outlet port for facilitating a guiding of the casting resin therethrough, said housing including a connection means for providing a connection of an interior of said housing to a vacuum source, the improvement comprising means for dividing the interior of said housing into successive degassing areas, through which areas the casting resin is successively guided to facilitate degassing, means for defining a degassing surface in each of the successive degassing areas, applying means for applying the casting resin in each degassing area to the degassing surface, so that the casting resin is degassed while applied to the degassing surface, the gas emanating from the casting resin being exhausted from the housing by the vacuum source, and stripping means for slidingly engaging the degassing surface for removing casting resin from the degassing surfaces and means for transferring the casting resin to the following area.

3. The device according to claim 2, wherein the housing comprises an upstanding cylinder with the inlet port being located adjacent an upper end of the upstanding cylinder and the outlet port being located adjacent a lower end, and wherein the means for dividing the interior of said housing into successive degassing areas includes plural movable pistons movable in said housing and each being in sealing and sliding engagement with an interior surface in the housing, each of the pistons having means defining an opening therein through which the casting resin can pass and support means for supporting said pistons for movement in a longitudinal direction of the housing.

4. The device according to claim 3, wherein the pistons form with the degassing surface an upwardly open trough.

5. The device according to claim 3, wherein the openings in the pistons are horizontally offset from one another.

6. The device according to claim 3, wherein the housing includes at least one level sensor in the lower end.

7. The device according to claim 3, wherein the support means includes a common piston rod for connecting the pistons together.

8. The device according to claim 7, wherein the piston rod includes means defining a pump piston at the lower end of the housing, the housing further including means defining a pump cylinder into which is received the pump piston.

9. The device according to claim 2, wherein the outlet port includes means defining a return pipeline connection into at least one of the degassing areas of the housing and a storage container.

10. The device according to claim 2, wherein the housing comprises a generally horizontally arranged cylinder having an inlet port and an outlet port located adjacent a lower end, wherein the means for dividing the interior of said housing into successive degassing areas includes threads of a screw rotatably supported in the housing, an outer contour of the screw being sealingly guided on the interior surface, and wherein a suction channel is arranged above the screw to facilitate the exhaust of gas from the housing.

11. The device according to claim 2, wherein the housing comprises an upstanding cylinder with the inlet port being located adjacent an upper end of the upstanding cylinder and the outlet port being located adjacent a lower end, and wherein the means for dividing the interior of said housing into successive degassing areas includes threads of a helical flight rotatably supported in the housing, an outer contour of the helical flight being sealingly guided on the interior surface in the housing.

12. The device according to claim 11, wherein the helical flights are reciprocally rotatable.

13. The device according to claim 2, wherein the housing comprises a substantially horizontally arranged cylinder having an inlet port and an outlet port located adjacent a lower end, wherein the means for dividing the interior of said housing into successive degassing areas includes several vertically upright partitions extending over a partial area of the cross-sectional height of the cylinder, wherein the means for dividing the interior of said housing into successive degassing areas further includes a plurality of plates each with a degassing surface thereon rotatable about a horizontal axis and guided with play in a respective one of the degassing areas, and wherein the stripping means is located adjacent an upper edge of each partition.

14. The device according to claim 13, wherein the plates are arranged on one common axle of rotation.

15. The device according to claim 2, wherein the device includes at least one of a heater device and a cooling device.

* * * * *